(12) United States Patent
Temple et al.

(10) Patent No.: US 7,386,218 B2
(45) Date of Patent: Jun. 10, 2008

(54) METHOD AND APPARATUS FOR AUTOMATIC VIDEO CD AUTHORING

(75) Inventors: Daniel Anthony Temple, Austin, TX (US); George Kokkosoulis, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 1168 days.

(21) Appl. No.: 10/124,320

(22) Filed: Apr. 17, 2002

(65) Prior Publication Data

US 2003/0198463 A1 Oct. 23, 2003

(51) Int. Cl.
*H04N 7/00* (2006.01)

(52) U.S. Cl. .................. 386/46; 386/83; 386/95; 386/96; 386/125; 386/126; 386/46; 348/448; 348/452

(58) Field of Classification Search ............ 386/95, 386/96, 125, 126, 83, 46; 348/452
See application file for complete search history.

(56) References Cited

U.S. PATENT DOCUMENTS

| | | | |
|---|---|---|---|
| 5,488,433 A * | 1/1996 | Washino et al. ............ 348/722 |
| 5,544,305 A * | 8/1996 | Ohmaye et al. ............ 715/776 |
| 5,734,719 A * | 3/1998 | Tsevdos et al. ............ 700/234 |
| 5,974,004 A | 10/1999 | Dockes et al. |
| 6,084,581 A * | 7/2000 | Hunt ...................... 715/500.1 |
| 6,204,840 B1 | 3/2001 | Petelycky et al. |
| RE37,342 E | 8/2001 | Washino et al. |
| 6,308,005 B1 * | 10/2001 | Ando et al. ................ 386/95 |
| 6,356,703 B1 * | 3/2002 | Nonomura et al. .......... 386/82 |
| 2002/0126994 A1 * | 9/2002 | Gunji et al. ............... 386/83 |

* cited by examiner

*Primary Examiner*—John Miller
*Assistant Examiner*—Jamie J Vent
(74) *Attorney, Agent, or Firm*—Haynes and Boone, LLP

(57) ABSTRACT

A method for authoring a Video CD in an information handling system includes creating chapter breaks as a function of video footage imported from a source. A static menu is created as a function of the chapter breaks. The video footage is transcoded. Lastly, the transcoded video footage and the static menu are burned onto a Video CD storage medium, wherein the static menu is configured to enable random access of the transcoded video footage according to the chapter breaks during a video playback.

23 Claims, 4 Drawing Sheets

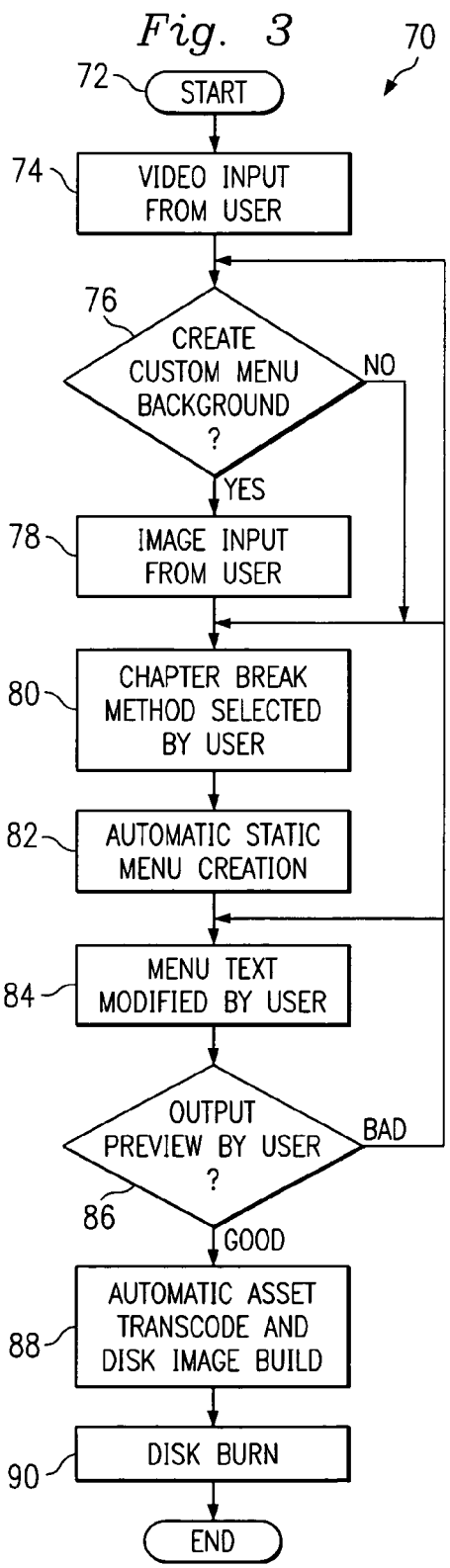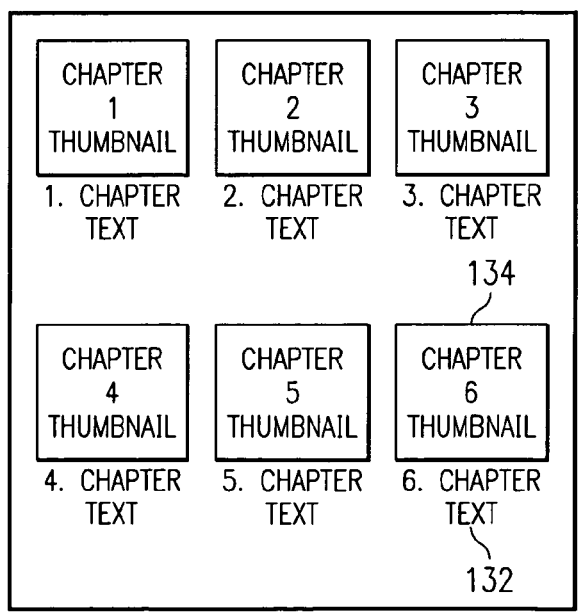

METHOD AND APPARATUS FOR AUTOMATIC VIDEO CD AUTHORING

BACKGROUND

The present disclosure relates generally to information handling systems, and more particularly to digital video content authoring.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In conjunction with information handling systems, the proliferation of analog and digital video cameras has enabled consumers to collect substantial amounts of video footage. The video is typically captured and stored in a tape format that usually is not the same as that of standard consumer video cassette recorder/players (VCRs). For example, analog and digital video cameras support formats such as DV, 8 mm or cVHS tape formats, whereas VCRs support VHS.

One problem that this presents is that it creates several obstacles for viewing, sharing, and/or archiving the video footage. For casual viewing, one needs to temporarily connect the camera to a television. For sharing with friends and family or archiving purposes, the video needs to be transformed to some other media, such as VHS tape.

One solution that solves several of the problems discussed above is the transfer of video footage to an optical medium. Transferring video footage to an optical medium can be accomplished either in a standalone consumer environment via a dedicated optical recorder or as part of a personal computer setup with the appropriate software and recordable optical drive.

In the case of the dedicated consumer optical recorder, efficiency, video quality and content degradation issues are addressed, as well as, solving the primary issue of video sharing. However, disadvantages that the dedicated consumer optical recorder solution presents are the relative high cost and lack of control of the video CD creation process. In addition, a Video CD created by a dedicated consumer optical recorder only offers sequential access to the video footage similar to magnetic tape.

In the case of a personal computer setup, video quality and content degradation issues are of concern. A personal computer setup is not as efficient as in the case of the standalone recorder because two distinct steps are required: one step for importing the video into the PC and another for converting the video into the appropriate format for Video CD. Advantages of the PC solution include the relative low cost, control of the Video CD creation process and the ability to allow for random access of the video via chapter points. However, disadvantages of the PC solution are the complexity and time inefficiency of Video CD creation applications.

Although transforming the video to another media is a seemingly acceptable solution, it has several disadvantages. The tape transfer process is time consuming, expensive and the final product does not preserve video quality due to analog video transfer generation loss as well as transient magnetic degradation.

Accordingly, it would be desirable to provide a method and apparatus for solving the problem of sharing video content absent the disadvantages found in the prior methods discussed above.

SUMMARY

According to one embodiment, a method for authoring a Video CD in an information handling system includes creating chapter breaks as a function of video footage imported from a source. A static menu is created as a function of the chapter breaks. The video footage is transcoded. Lastly, the transcoded video footage and the static menu are burned onto a Video CD storage medium, wherein the static menu is configured to enable random access of the transcoded video footage according to the chapter breaks during a video playback.

BRIEF DESCRIPTION OF THE DRAWINGS

FIG. 3 shows a flow diagram view illustrating an example user experience with the fast mode of the Video CD authoring method according to one embodiment;

FIG. 4 illustrates an example fast mode static menu image;

FIG. 6 illustrates an example quality mode static menu image; and

DETAILED DESCRIPTION

According to one embodiment of the present disclosure, a method and system apparatus are disclosed for providing an automated, yet controllable, process for running on an information handling system. The method and system convert video footage, for example, consumer video footage, originating from tape in any format, to an easily shared and inexpensive Video CD. The process can be better understood by reference to the flow charts, drawing figures, and additional discussion included herein.

As stated above, the primary disadvantages of the prior PC Video CD creation solutions are the usage complexity and process inefficiency. Prior solutions require several manual steps from video capture to Video CD burning.

Figure 1:
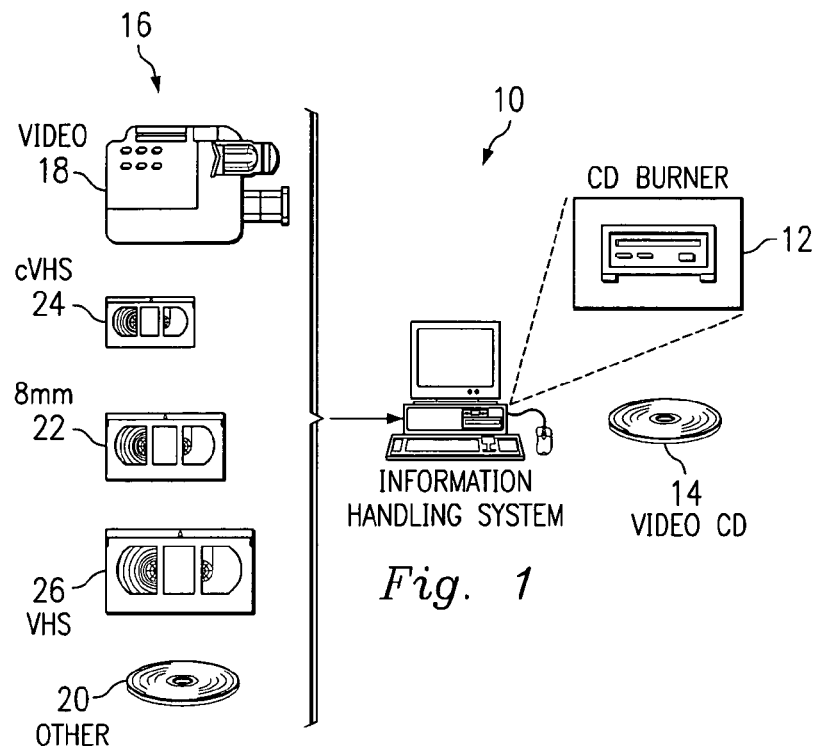
FIG. 1 illustrates a plan view diagram of an information handling system for Video CD authoring according to an embodiment of the present disclosure.

Referring now to FIG. 1, an information handling system for Video CD authoring according to an embodiment of the present disclosure is designated in general by reference numeral 10. Information handling system 10 includes a CD burner 12 for authoring one or more video CDs 14 as further discussed herein. According to one embodiment, the video footage input to the information handling system 10 includes footage that is typically captured and stored in a tape format 16 that is usually not the same as that of standard consumer video cassette recorder/players (VCRs). For example, an analog and/or digital video camera, generally indicated by reference numeral 18, may support a format such as DV (20), 8 mm (22) or cVHS (24) tape formats, or VHS (26).

For purposes of this disclosure, information handling system 10 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, information handling system 10 may be a personal computer, a network storage device, or any other suitable device and may vary in size, shape, performance, functionality, and price. The information handling system 10 may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. For example, information handling system 10 may include a CD burner 12. The information handling system may also include one or more buses operable to transmit communications between the various hardware components.

According to one embodiment, a method for authoring a Video CD in an information handling system includes importing video footage from a source and creating chapter breaks as a function of the video footage imported from the source. A static menu is created as a function of the chapter breaks. The imported video footage is then transcoded. The static menu and transcoded video footage are stored in temporary memory, and subsequently; transcoded onto a Video CD storage medium. The static menu is configured to enable random access of the transcoded video footage according to the chapter breaks during a video playback.

Figure 2:
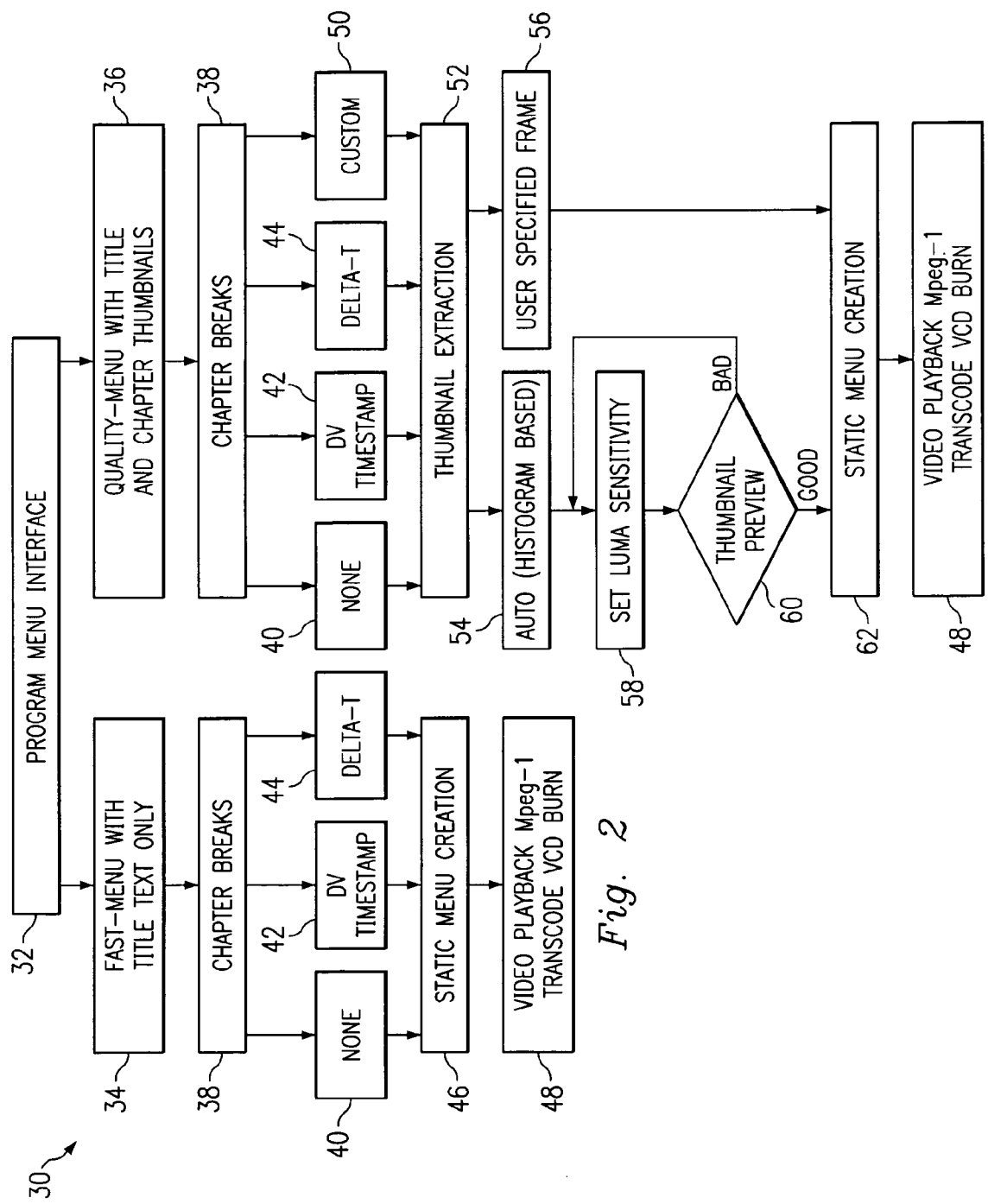
FIG. 2 illustrates a flow diagram view of the Video CD authoring method according to another embodiment of the present disclosure.

FIG. 2 illustrates a flow diagram view of the Video CD authoring method according to one embodiment of the present disclosure. The flow diagram 30 illustrates a program menu interface 32 having two modes of operation. The modes of operation include a fast mode 34 and a quality mode 36.

According to one embodiment, the fast mode 34 produces a static menu with title text only. The quality mode 36 produces a static menu with title and chapter thumbnails. The static menu will be discussed further herein below.

With respect to chapter breaks 38, the fast mode 34 is responsive to a specification of the format of the original video, whether analog or digital, and an optional user specified Video CD chapter creation method for creating chapter breaks. Video CD chapters allow for random access of the Video CD. Accordingly, in the fast mode 34, options for chapter breaks 38 include none 40, DV timestamp 42, and delta-T 44.

If chapters are to be created, the authoring method and system present one or two options depending on the video input format. In the case of analog video input, the method and system enable chapter breaks to occur at a specified time interval (delta-T 44) from one another. That is, responsive to importing of the video footage, upon expiration of the time interval, the method and system create a new chapter. Upon creation of a new chapter, the method and system apparatus begin the time interval over again for use in creating a next chapter break.

In the case of digital video, the method and system apparatus make an additional option available which uses the DV timestamp 42 information. The DV specification provides for absolute time information along with the recorded video. When video is recorded in discontinuous time segments, the gap in the time information can be used to determine the Video CD chapter points.

Subsequent to formation of the chapter breaks, a static menu 46 is created, as discussed further herein. In a next step, depending upon a selected video format, the method and system apparatus transcode the input video footage to Video CD compliant MPEG-1 (352×240 for NTSC or 352×256 for PAL) via software or hardware or a combination of the two. According to one embodiment of the present disclosure, the transcode and burn processes of the method and system apparatus are simultaneous.

Creating chapter breaks is included for both the first and second modes of operation, the first mode corresponding to the fast mode 34 and the second mode corresponding to the quality mode 36. In addition, the fast mode 34 and quality mode 36 operate as a function of a user specified chapter creation variable, the chapter creation variable including at least one of none 40, DV timestamp 42, delta-T 44, and custom 50. For example, in the quality mode, establishing chapter breaks further includes establishing chapter breaks as a function of using custom chapter breaks 50.

Accordingly, creating chapter breaks may further include specifying a format of the video footage as analog or digital, and optionally specifying a Video CD chapter creation method. As discussed, the Video CD chapters allow for random access of the Video CD upon playback.

In the case of analog video input, creating the chapter breaks according to a delta-T time interval can include a user specified interval.

In the case of digital video input, creating the chapter breaks can include using DV time stamp information. Digital video includes recorded video and absolute time information of the recorded video. In addition, for digital video input, creating the chapter breaks the DV time stamp information can be used for defining a chapter by the occurrence of first and second discontinuous time segments. Furthermore, the first and second discontinuous time segments can comprise consecutive occurring discontinuous time segments and wherein the first and second discontinuous time segments comprise discontinuous time segments greater than a prescribed threshold discontinuous time segment.

According to one embodiment, transcoding the video footage includes transcoding to Video CD compliant MPEG-1. This can be accomplished via software, hardware, or a combination of software and hardware. The Video CD compliant MPEG-1 transcode includes 352×240 for NTSC or 352×256 for PAL. The method further comprises simultaneously transcoding the video footage to Video CD compliant MPEG-1 and burning the Video CD compliant MPEG-1 onto a Video CD optical storage medium.

With respect to the static menu, it can include a numbered chapter text list and/or an array of chapter thumbnails.

Creating the static menu during a quality mode 36 includes creating the static menu to have chapter thumbnails 52, wherein creating the chapter thumbnails 52 includes one of automatic creation 54 or optional creation by manual extraction 56. Creation by manual extraction 56 includes manually scanning the chapters and selecting single frames from respective chapters for use as the corresponding chapter thumbnails.

Automatic creation of the chapter thumbnails 54 includes selecting a first meaningful frame of a chapter for the respective chapter thumbnail according to a luminance histogram analysis of a respective frame. The first meaningful frame includes evenly distributed luminance information determined as a function of a user-adjustable variable representative of a threshold value for determining a meaningful frame. Such a threshold value can be established by setting a luma sensitivity, indicated by reference numeral 58.

In addition, the method further includes providing a thumbnail approval preview, indicated by reference numeral 60. The thumbnail approval preview is adapted to enable at least one of an acceptance and a thumbnail sensitivity adjustment. In another embodiment, the thumbnail approval preview is adapted to enable at least one of an acceptance, a thumbnail sensitivity adjustment, and a manual selection of frames to be used as chapter thumbnails. Accordingly, during a static menu creation 62, the static menu can be created to include one or more of chapter identifications and chapter thumbnails.

The static menu is configured to enable random access to one or more desired chapters during a playback of the Video CD according to the at least one of chapter identifications and chapter thumbnails. In one embodiment, the chapter identifications and chapter thumbnails include sequentially numbered chapter thumbnails. In addition, creating the static menu can further include establishing at least one of a descriptive title for the menu, background image, and background color.

FIG. 3 shows a flow diagram view 70 an example user experience with the fast mode of the Video CD authoring method according to one embodiment. To begin the authoring program in Fast Mode, the application launches at 72 and then prompts a user to import desired video assets at 74. After importing the desired files, the application prompts the user with an option of whether or not to create a custom background image for the static menu or simply use a default background. The default background may include black or another color, for example.

If a custom image is to be used for the background, the application imports a user specified still image file at 78. The next step 80 includes determining chapter breaks, for example, by a user selected choice of no chapter breaks, chapter breaks is at each DV timestamp discontinuity, or chapter breaks at a predetermined time delay.

The application then auto-generates the static menu at 82. The application creates the static menu according to the user's specifications, creating a numbered text list of the chapters created. In a next step 84, the application provides for a user modification of the static menu text. Accordingly, the application and system user will have an opportunity to modify any of the text on the menu. After the desired text changes have been made to the menu, the application provides a sneak preview 86 of the disk that the application is about to create, and further provides an ability to return to any prior stage to change any of the application parameters previously set. In response to an approval of the preview, the application proceeds with an automatic transcode of the video assets to the appropriate compression scheme and builds a temporary image of the disk on the system hard drive at 88. The application then burns the image to the Video CD media at 90.

FIG. 4 illustrates an example fast mode static menu image 92. The static menu 92 includes an example of text listing of chapters numbered 1-6 and corresponding custom chapter identification text.

Figure 5:
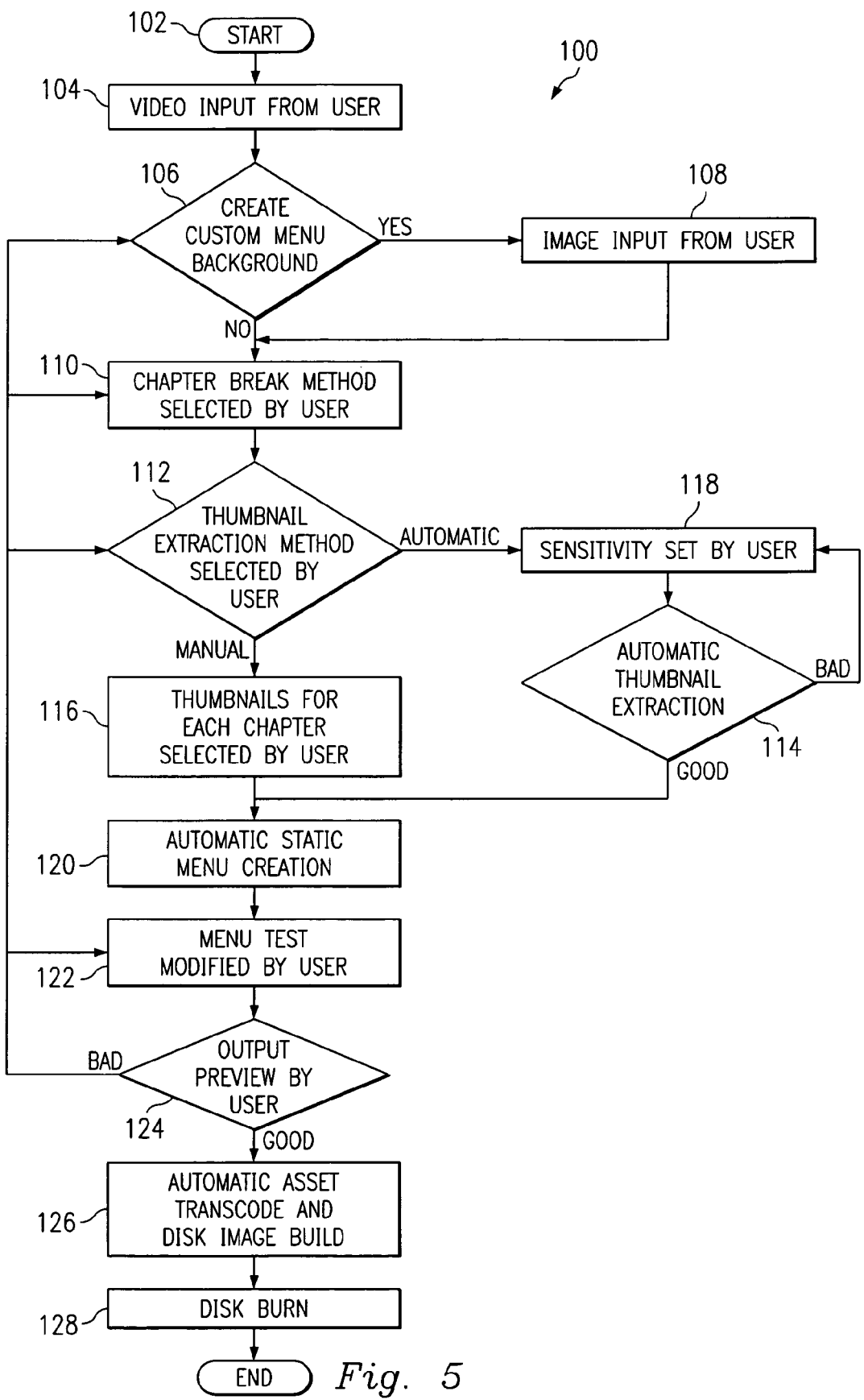
FIG. 5 shows a flow diagram view illustrating an example user experience with the quality mode of the Video CD authoring method according to one embodiment.

FIG. 5 shows a flow diagram view 100 illustrating ian example user experience with the quality mode of the Video CD authoring method according to one embodiment. To begin the authoring program in the Quality Mode, the application launches at 102 and then prompts a user to import desired video assets at 104. After importing the desired files, the application prompts the user with an option whether or not to create a custom background image for the static menu or simply use a default background. The default background may include black or another color, for example.

If a custom image is to be used for the background, the application imports a user specified still image file at 108. The next step 110 includes determining chapter breaks, for example, by a user selected choice of no chapter breaks, chapter breaks at each DV timestamp discontinuity, or chapter breaks at a predetermined time delay. In the Quality mode, the chapter breaks further include an additional option of inserting chapter breaks manually.

In a next step 112, the application determines a thumbnail extraction method, for example, by prompting the user. The user can choose between an automatic thumbnail extraction 114 and manual extraction 116. The automatic thumbnail extraction is based, for example, on a luma histogram analysis. With respect to the manual extraction, the user scans each chapter and selects a single frame to be used as the respective chapter thumbnail. In addition, for automatic thumbnail extraction 114, the application provides for a user selectable or arbitrarily setting of the histogram analysis sensitivity in 118. Setting of the sensitivity of the histogram analysis includes effectively changing the gamma variable. The application also provides for a subsequent opportunity to change the sensitivity, in the event that the initial set of extracted thumbnails are not acceptable. For example, acceptability/unacceptability can be determined during a subsequent static menu preview and approval/un-approval.

Subsequent to thumbnail extraction, the application then auto-generates the static menu at 120. The application creates the static menu according to the user's specifications, creating one or more of a numbered text list, an array of thumbnails with associated text of the chapters created. In a next step 122, the application provides for a user modification of the static menu text. Accordingly, the application and system user will have an opportunity to modify any of the text on the menu with the exception of the chapter numbers themselves. After the desired changes have been made to the menu, the application provides a sneak preview 124 of the disk that the application is about to create, and further provides an ability to return to any prior stage to change any of the application parameters previously set. In response to an approval of the preview, the application proceeds with an automatic transcode of the video assets to the appropriate compression scheme and builds a temporary image of the disk on the system hard drive at 126. The application then burns the image to the Video CD media at 128.

FIG. 6 illustrates an example quality mode static menu image 130. The static menu 130 includes an example of text listing of chapters numbered 1-6 and corresponding custom chapter identification text 132, in addition to corresponding thumbnails 134.

Figure 7:
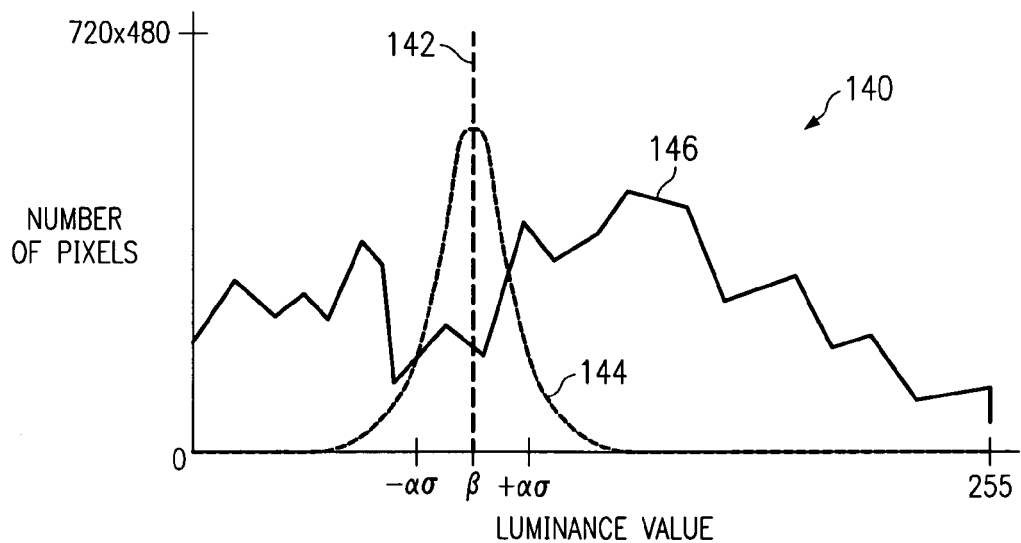
FIG. 7 illustrates an example luminance histogram for use according to one embodiment of the present disclosure.

FIG. 7 illustrates an example luminance histogram 140 for use according to one embodiment of the present disclosure. As discussed herein above with respect to FIG. 5, in the Quality mode according to one embodiment, a static menu screen gets created with individual chapter thumbnails either automatically or with minimum user involvement. In the case of the automatic thumbnail extraction, a luminance histogram with statistical metrics is used.

An extraction procedure using a luminance histogram ensures that a meaningful frame is selected for use as a thumbnail. A meaningful frame is one that contains evenly distributed luminance information. The first frame of a video sequence may not be the most appropriate for a thumbnail because of underexposure or overexposure. Accordingly, the method and apparatus of the present embodiments are configured to identify the first meaningful frame based on a condition as discussed below.

As illustrates in FIG. 7, the luminance histogram 140 is characterized by the number of pixels per luminance value. The vertical axis represents a number of pixels, for example, ranging from 0 to 720×480. The horizontal axis represents a luminance value, ranging, for example, from 0 to 255. The line designated by reference numeral 142 is representative of a perfect single-luma frame. The line designated by the reference numeral 144 is representative of a non-perfect perceived single luma frame. Lastly, the line designated by reference numeral 146 is representative of an arbitrary multi-luma frame.

Furthermore, with the luminance histogram 140 of FIG. 7, $\alpha$ is an arbitrary standard deviation multiplier, and $\beta$ is the mean luminance value. A frame is unacceptable as a thumbnail if:

$$0 \leq (\beta+\alpha\sigma)-(\beta-\alpha\sigma) < \gamma,$$

where $\gamma$ is an arbitrary approximation of the maximum allowable width of a non-perfect, perceived, single-luma frame's histogram curve. The lower limit, 0, represents the case of a perfect, single-luma frame.

Accordingly, the graph of FIG. 7 illustrates the luminance characteristics of three different types of video frames. A perfect single-luma frame is one in which all pixels contain identical luminance information, such as a solid black frame. A nonperfect, perceived, single-luma frame is one that appears to the viewer as a perfect single-luma frame, but in fact contains slight variations in luminance values between pixels. Typically, there are eight bits of luminance information for each pixel. For this scale, 0-255, the human eye can distinguish a difference in luminance of five to eight values, which explains the possibility of a non-perfect, perceived, single-luma frame.

An arbitrary multi-luma frame is generically represented here as any frame which contains a wide range, or evenly distributed set, of luminance values. While a perfect single-luma frame is mathematically simple, the equation above is intended to cover that case as well as that of the non-perfect single-luma frame. Although, $\sigma$ and $\beta$ are statistical values calculated from a frame's luminance content and $\alpha$ is a constant, $\gamma$ is a user-adjustable variable that represents the threshold value for determining a meaningful frame.

After the user sets the sensitivity for thumbnail extraction and the thumbnail approval preview is generated, the user will then accept the thumbnails or return to adjust their sensitivity variable. If the user wishes to have greater thumbnail control, at the cost of processing time, they may choose to manually select each frame that will be used as thumbnails. During the static menu creation process, the user may enter a descriptive title for the menu, background image or color, and can preview the full menu with title text and sequentially numbered thumbnails.

It should be noted that for the Fast mode, the static menu would only contain title text, background image or color, and the appropriate chapter number sequence. Unlike prior solutions, the proposed method of static menu creation requires no user interaction when defining chapters, and thus automatically generating the composite static menu layout. As with the Fast mode, the Quality mode transcode and burn processes are simultaneous.

According to another embodiment, an information handling system 10 for authoring a Video CD includes a processor for creating chapter breaks as a function of video footage imported from a source. The processor creates a static menu as a function of the chapter breaks. Subsequent to creating chapter breaks, the processor transcodes the video footage. The processor temporarily stores the static menu and the transcoded video footage in a system memory. The processor then burns the transcoded video footage and the static menu onto a Video CD storage medium. The static menu is configured to enable random access of the transcoded video footage according to the chapter breaks during a video playback.

According to another embodiment, a computer program is provided for authoring a Video CD. The computer program is processable by the information handling system 10 for causing the information handling system 10 to create chapter breaks as a function of video footage imported from a source, create a static menu as a function of the chapter breaks, transcode the video footage, and burn the transcoded video footage and the static menu onto a Video CD storage medium. The static menu is configured to enable random access of the transcoded video footage according to the chapter breaks during a video playback.

Accordingly, the information handling system 10 produces video to optical media, authored into a digital video, and more particularly, to a VCD video disk format. In addition, according to another embodiment of the present disclosure, a method is provided for authoring/producing digital video and audio content to a VCD video disk format.

Although only a few exemplary embodiments have been described in detail above, those skilled in the art will readily appreciate that many modifications are possible in the exemplary embodiments without materially departing from the novel teachings and advantages of the embodiments of the present disclosure. For example, while the illustrative embodiments have been described with as including a VCD video disk format, the method of authoring of the present disclosure also contemplates other formats, for example, including but not limited to, a DVD read/write format. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for authoring a Video CD in an information handling system, the method comprising:
   creating chapter breaks to create chapters, including a first and second mode of operation, as a function of video footage imported from a source, both modes providing for creating a static menu as a function of the chapter breaks, wherein creating the static menu during the second mode includes creating chapter thumbnails, wherein the creating of the chapter thumbnails includes automatic extraction of a first frame according to a histogram analysis and manual extraction of a second frame according to a single frame selection, and wherein the first and second frames are selected after the chapters are created and the first and second frames are selected from any frame within the chapter;

transcoding the video footage; and burning the transcoded video footage and the static menu onto a Video CD storage medium, the static menu configured to enable random access of the transcoded video footage according to the chapter breaks during a video playback.

2. The method of claim 1, wherein the first mode corresponds to a fast mode and the second mode corresponds to a quality mode.

3. The method of claim 2, further wherein the fast mode and quality mode operate as a function of a user specified chapter creation variable, the chapter creation variable including at least one of none, DV timestamp, delta-T, and custom.

4. The method of claim 1, wherein creating chapter breaks includes specifying a format of the video footage as one of analog and digital, and optionally specifying a Video CD chapter creation method, wherein Video CD chapters allow for random access of the Video CD upon playback.

5. The method of claim 1, wherein creating chapter breaks includes specifying a format of the video footage, whether analog or digital, and optionally specifying a Video CD chapter break creation method.

6. The method of claim 5, wherein the chapter break creation method includes establishing chapter breaks as a function of using one of no chapter breaks, using DV timestamps, and using delta-T intervals.

7. The method of claim 3 wherein, for the quality mode, establishing chapter breaks further includes establishing chapter breaks as a function of using custom chapter breaks.

8. The method of claim 4, wherein further, for analog video input, creating the chapter breaks according to a delta-T time interval.

9. The method of claim 8, wherein delta-T time interval comprises a user specified interval.

10. The method of claim 4, wherein further, for digital video input, creating the chapter breaks using DV time stamp information, wherein the digital video input includes recorded video and absolute time information of the recorded video.

11. The method of claim 4, wherein further, for digital video input, creating the chapter breaks according to DV time stamp information, the DV time stamp information defining a chapter by the occurrence of first and second discontinuous time segments.

12. The method of claim 11, further wherein the first and second discontinuous time segments comprise consecutive occurring discontinuous time segments and wherein the first and second discontinuous time segments comprise discontinuous time segments greater than a prescribed threshold discontinuous time segment.

13. The method of claim 1, wherein transcoding the video footage includes transcoding to Video CD compliant MPEG-1, via one of software, hardware, and a combination of software and hardware.

14. The method of claim 13, wherein the Video CD compliant MPEG-1 transcode includes one of 352×240 for NTSC and 352×256 for PAL.

15. The method of claim 13, further comprising simultaneously transcoding the video footage to Video CD compliant MPEG-1 and burning the Video CD compliant MPEG-1 onto a Video CD optical storage medium.

16. The method of claim 1, wherein the static menu includes at least one of a numbered chapter text list and an array of chapter thumbnails.

17. The method of claim 16, further comprising providing a thumbnail approval preview, the thumbnail approval preview adapted to enable at least one of an acceptance, a thumbnail sensitivity adjustment, and a manual selection of frames for use as chapter thumbnails.

18. The method of claim 17, wherein the static menu includes at least one of chapter identifications and chapter thumbnails, the static menu further configured to enable random access to one or more desired chapters during a playback of the Video CD according to the at least one of chapter identifications and chapter thumbnails.

19. The method of claim 18, wherein the chapter identifications and chapter thumbnails include sequentially numbered chapter thumbnails.

20. The method of claim 19, wherein creating the static menu further includes establishing at least one of a descriptive title for the menu, background image, and background color.

21. An information handling system for authoring a Video CD comprising:

a processor for creating chapter breaks to create chapters, including a first and a second mode of operation, as a function of video footage imported from a source, both modes including a processor for creating a static menu as a function of the chapter breaks, wherein creating the static menu during the second mode includes creating chapter thumbnails, the creating of the chapter thumbnails including automatic extraction of a first frame according to a histogram analysis and manual extraction of a second frame according to a single frame selection, and wherein the first and second frames are selected after the chapters are created and the first and second frames are selected from any frame within the chapter;

a processor for transcoding the video footage; and a processor for burning the transcoded video footage and the static menu onto a Video CD storage medium, the static menu configured to enable random access of the transcoded video footage according to the chapter breaks during a video playback.

22. A computer program for authoring a Video CD, the computer program processable by an information handling system for causing the information handling system to:

create chapter breaks to create chapters, including a first and a second mode of operation, as a function of video footage imported from a source, both modes provided to create a static menu as a function of the chapter breaks, wherein creating the static menu during the second mode includes creating chapter thumbnails, the creating of the chapter thumbnails including automatic extraction of a first frame according to a histogram analysis and manual extraction of a second frame according to a single frame selection, and wherein the first and second frames are selected after the chapters are created and the first and second frames are selected from any frame within the chapter;

transcode the video footage; and burn the transcoded video footage and the static menu onto a Video CD storage medium, the static menu configured to enable random access of the transcoded video footage according to the chapter breaks during a video playback.

23. A method for authoring a video storage medium in an information handling system, the method comprising:
- creating chapter breaks to create chapters, including a first mode and a second mode of operation, as a function of video footage imported from a source;
- creating a static menu as a function of the chapter breaks, wherein creating the static menu during the second mode includes creating chapter thumbnails, the creating of the chapter thumbnails including automatic extraction of a first frame according to a histogram analysis and manual extraction of a second frame according to a single frame selection, and wherein the first and second frames are selected after the chapters are created and the first and second frames are selected from any frame within the chapter;
- transcoding the video footage; and
- burning the transcoded video footage and the static menu onto a video storage medium, the static menu configured to enable random access of the transcoded video footage according to the chapter breaks during a video playback.

* * * * *